United States Patent
Talon

(10) Patent No.: US 10,173,834 B2
(45) Date of Patent: Jan. 8, 2019

(54) BEVERAGE CAPSULE WITH SPRAYING-PREVENTION MEANS

(71) Applicant: NESTEC S.A., Vevey (CH)

(72) Inventor: Christian Talon, Vufflens-le-Chateau (CH)

(73) Assignee: Nestec S.A., Vevey (CH)

( * ) Notice: Subject to any disclaimer, the term of this patent is extended or adjusted under 35 U.S.C. 154(b) by 192 days.

(21) Appl. No.: 14/431,363

(22) PCT Filed: Oct. 4, 2013

(86) PCT No.: PCT/EP2013/070718
§ 371 (c)(1),
(2) Date: Mar. 26, 2015

(87) PCT Pub. No.: WO2014/053638
PCT Pub. Date: Apr. 10, 2014

(65) Prior Publication Data
US 2015/0251847 A1 Sep. 10, 2015

(30) Foreign Application Priority Data

Oct. 5, 2012 (EP) ..................................... 12187344

(51) Int. Cl.
*B65D 85/804* (2006.01)
*A47J 31/40* (2006.01)
*A47J 31/36* (2006.01)

(52) U.S. Cl.
CPC ........ *B65D 85/8043* (2013.01); *A47J 31/369* (2013.01); *A47J 31/407* (2013.01)

(58) Field of Classification Search
CPC ............ B65D 85/8043; B65D 85/8046; B65D 85/804; A47J 31/407; A47J 31/369; A47J 31/3628; A47J 31/3695; A47J 31/3623

(Continued)

(56) References Cited

U.S. PATENT DOCUMENTS

| 3,811,373 A * | 5/1974 | Telco ................. B65D 85/8043 426/77 |
| 7,543,527 B2 * | 6/2009 | Schmed .............. A47J 31/0673 426/115 |
| 2011/0030563 A9 * | 2/2011 | Doglioni Majer ......................... B65D 85/8043 99/295 |

FOREIGN PATENT DOCUMENTS

| EP | 1555218 | 7/2005 |
| EP | 1792849 | 6/2007 |

(Continued)

OTHER PUBLICATIONS

Around Defintion. Merriam Webster Online Dictionary. Apr. 10, 2010. Retrieved from: <https://web.archive.org/web/20100410165425/https://www.merriam-webster.com/dictionary/around>.*

*Primary Examiner* — Erik Kashnikow
*Assistant Examiner* — Ashley Axtell
(74) *Attorney, Agent, or Firm* — K&L Gates LLP

(57) ABSTRACT

The present invention concerns a beverage capsule (300) comprising a capsule body (301) defining a cavity (302) in communication an open end (304), an injection wall (303) enclosing the cavity (302), a partition dividing the cavity (302) into an injection space (306) and a product space (307) which has at least one channel (311) configured to retard fluid flow between the two spaces, a rupturing means (309) within said injection space (306) configured to rupture said injection wall when deflected into said cavity (302), and a quantity of a beverage ingredient (308) within said product space (307); characterized in that it comprises a sealing support (312) disposed about said rupturing means (309), projecting from said partition (305) towards said injection wall (303), having a sealing surface (313) proximal to said injection wall (303), and configured to contact said injection (Continued)

wall (303) when it is deflected into said cavity (302) of said capsule body (301).

11 Claims, 4 Drawing Sheets

(58) Field of Classification Search
USPC .............. 426/112, 115, 77–84, 432, 433, 434
See application file for complete search history.

(56) References Cited

FOREIGN PATENT DOCUMENTS

| WO | 2006030461 | 3/2006 | | |
|----|------------|--------|---|---|
| WO | 2006127113 | 11/2006 | | |
| WO | 2006127118 | 11/2006 | | |
| WO | WO 2008125256 A1 * | 10/2008 | ......... | B65D 85/8043 |
| WO | WO 2009115475 A1 * | 9/2009 | ......... | B65D 85/8043 |
| WO | WO 2010112353 A1 * | 10/2010 | ............ | A47J 31/407 |

\* cited by examiner

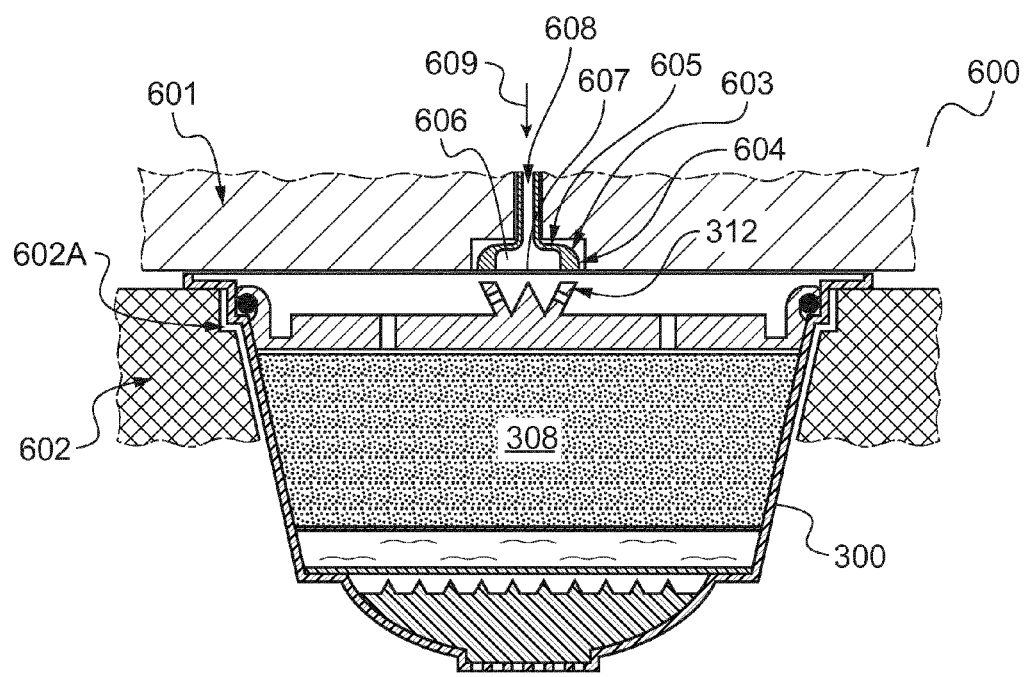
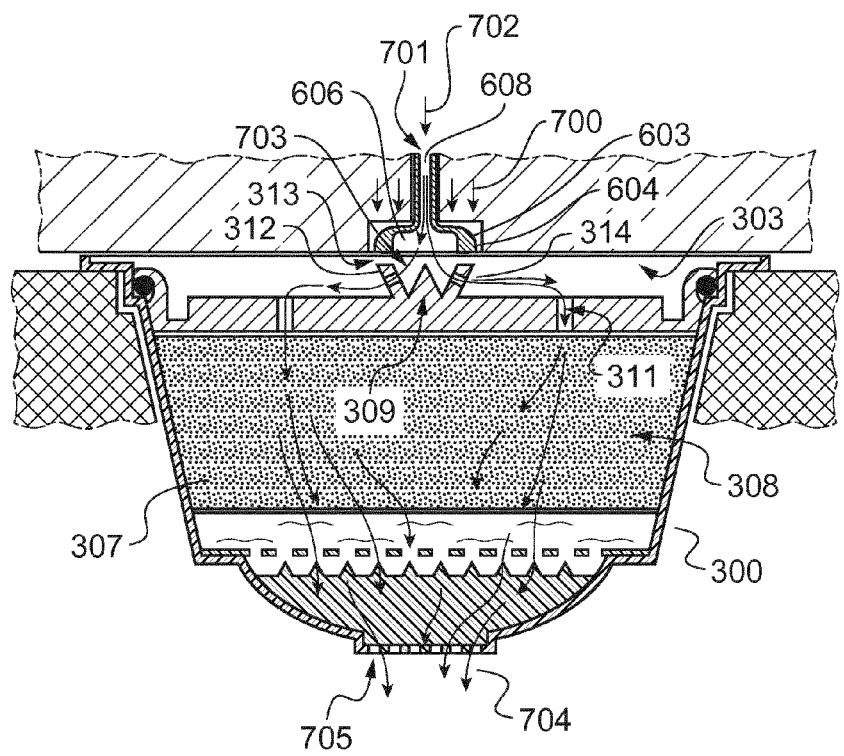

BEVERAGE CAPSULE WITH SPRAYING-PREVENTION MEANS

CROSS REFERENCE TO RELATED APPLICATIONS

The present application is a National Stage of International Application No. PCT/EP2013/070718, filed on Oct. 4, 2013, which claims priority to European Patent Application No. 12187344.2, filed on Oct. 5, 2012, the entire contents of which are being incorporated herein by reference.

FIELD OF THE INVENTION

The present invention concerns a capsule for containing a beverage ingredient, suitable for use with a beverage preparation machine. The present invention also concerns a method for preparing a beverage from such a capsule, as well as a configuration for such an apparatus.

BACKGROUND

Beverage preparation machines are well known in the food industry and consumer goods domain. Such machines allow a consumer to prepare on command a single serving of a beverage such as brewed coffee, espresso coffee, tea, hot chocolate drink, or the like.

Most beverage preparation machines for in-home use operate according to a system in which beverage ingredients are provided as individually-packaged, single-serving portions. Such portions can be soft pods, pads, or sachets, but increasingly more systems use semi-rigid or rigid portions such as rigid pods or capsules. In the following, it should be understood that the beverage machine in question is a beverage preparation machine working with a rigid or semi-rigid capsule.

In many instances, the capsules for use in beverage preparation machines are sealed. Such sealed capsules are advantageous in that they protect the ingredient contained therein from the surrounding atmosphere, improving the shelf life of the capsule. Typically, such closed capsules are made from a gas and/or moisture impermeable material, and feature a rigid or semi-rigid body having one of its walls made from a flexible membrane.

The beverage is prepared by inserting the capsule into a beverage machine, which preferably comprises a receptacle for accommodating said capsule and a fluid injection system for injecting a fluid (preferably water) under pressure into said capsule. In most applications, the water injected into the capsule under pressure is heated, generally to a temperature above 70° C. However, in some particular instances it may be advantageous to inject tepid or chilled water instead. The pressure inside the capsule chamber during extraction and/or dissolution of the capsule contents is typically about 1 to about 8 bar for dissolution products and about 2 to about 12 bar for extraction of roast and ground coffee.

The present invention could also encompass the so-called "brewing" process of beverage preparation particularly for tea and coffee. Brewing involves the infusion over time of the ingredient in a fluid, most commonly hot water, whereas extraction or dissolution preparations produce a beverage within a few seconds.

For purposes of clarity, however, in this document the term "brewing" of an ingredient by a fluid is understood to encompass extraction of a powdered edible material (e.g. roast and ground powdered coffee), dissolution of edible soluble material (e.g. soluble tea, coffee, milk, or cocoa), or the infusion of an edible material in an infusion fluid under very low or atmospheric pressure, for a longer time than that required for extraction or dissolution (e.g. tea leaves in hot water).

The principle of extracting and/or dissolving the contents of a closed capsule under pressure is known and consists typically of confining the capsule in a receptacle of a machine, injecting a quantity of pressurized water into the capsule to extract or dissolve the substance, and then dispensing the resulting beverage from the capsule.

The injection is generally performed by piercing a face of the capsule with a piercing injection element, such as a fluid injection needle incorporated into the machine. Capsules applying this principle have already been described, for example in applicant's European patent n° EP 1 472 156 B1, and in EP 1 784 344 B1.

In addition, machines applying this principle have already been described for example in patents CH 605 293 and EP 242 556. According to these documents, the machine comprises a receptacle for the capsule, and a perforation and injection element made in the form of a hollow needle comprising in its distal region one or more liquid injection orifices. The needle has a dual function in that it simultaneously opens the top portion of the capsule while providing an inlet channel into the capsule for the injection of the water.

The machine further comprises a supply of the fluid (usually water) that is used to prepare the beverage from the ingredient(s) contained in the capsule. The machine further comprises a heating unit such as a boiler or a heat exchanger, which heats the water used therein to working temperatures (usually between 80° and 90° C.). Finally, the machine comprises a pump for circulating the water from the tank to the capsule, optionally though the heating unit. The circulation of the water within the machine may be directed via a selecting valve means, such as for instance a peristaltic valve of the type described in applicant's European patent application EP 2162653 A1.

Such systems are particularly well-adapted to the preparation of coffee. One configuration for achieving this which is particularly advantageous is to provide a capsule containing roast and ground coffee powder, which is extracted with hot water injected therein.

Capsules have been developed for such an application, which are described and claimed in applicant's European patent EP 1 784 344 B1, or in European patent application EP 2 062 831.

In short, such capsules typically comprise:
- a hollow body and an injection wall which are impermeable to liquids and to air, the wall being attached to the body and adapted to be punctured by e.g. an injection needle of the machine;
- a chamber containing a bed of roast and ground coffee to be extracted;
- an aluminium membrane disposed at the bottom end of the chamber for retaining the internal pressure therein, the membrane being associated with piercing means which create drainage holes in the aluminium membrane when the internal pressure inside the chamber reaches a certain pre-determined value; and
- optionally, a deflection means configured to break up the jet of fluid, thereby reducing the speed of the jet of fluid injected into the capsule and evenly distributing the fluid across the bed of substance at a reduced speed.

During extraction, the beverage capsule is pierced by the fluid injection needle of the beverage preparation machine, usually in the aluminium membrane. The liquid is injected in the capsule compartment and the pressure within the capsule increases, facilitating the extraction of the beverage from the ingredients contained within the capsule.

In some implementations, the beverage machine also pierces the capsule at a second location, for instance at its bottom, permitting the beverage to flow out during the operation of the machine. In others, the beverage capsule may be provided with a spout or drain, to which is generally affixed a valve or a membrane that opens when the pressure within the capsule builds up to the level required for proper beverage preparation.

In the prior art capsules, when the fluid injection needle of the machine is removed from the capsule, after the beverage has been prepared and dispensed, the capsule top membrane is pierced and a hole "H" remains as illustrated in FIG. 1. However, in such a case, a residual pressure "P" remains within the capsule compartment due to gas that may remain trapped within the capsule under pressure.

When the capsule contains soluble ingredient "RG" to extract, the capsule compartment generally comprises a single cavity, and the residual fluid pressure is distributed across the compartment volume.

In all cases, the residual pressure P may cause a jet of liquid "JL"—often referred to as "backflow"—to spray out of the hole H. Such a backflow is represented in FIG. 1. Although such a phenomenon occurs infrequently, it is undesirable to permit hot liquid to spout from the capsule. Moreover, such leakage may contain beverage ingredients, which will negatively affect the cleanliness of the beverage machine and its operation.

In WO 2006/127113 application is described a system comprising a beverage preparation machine that is adapted to functionally adapt a pod or similar containing an ingredient. The ingredient pod described therein is a simple pod, of the type having a paper shell, like infusion bags. The pod is inserted within the machine, and a fluid such as water is passed through the ingredient to prepare a beverage. The system disclosed in this application does not comprise a system to prevent backflow of product out of the pod when the machine is open again after use.

It is therefore an objective of the present invention to provide a solution for beverage preparation system which resolves the problems of the beverage capsules of the prior art as described above.

SUMMARY OF THE INVENTION

According, therefore, to a first aspect of the invention, the invention is directed to a beverage capsule comprising a substantially cup-shaped capsule body, said capsule body having an open end and defining a cavity in communication with said open end; an injection wall disposed upon said open end so as to enclose said cavity; a partition, said partition being disposed within said capsule body and dividing said cavity into an injection space adjacent to said injection wall and a product space opposite said injection wall, said partition being provided with at least one channel extending through the thickness of said partition and being configured to retard fluid flow between said injection space and said product space; a rupturing means disposed within said injection space, said rupturing means configured to rupture said injection wall when said injection wall is deflected into said cavity of said capsule body; and a quantity of a beverage ingredient disposed within said product space.

According to the invention, the beverage capsule comprises a sealing support, said sealing support projecting from said partition towards said injection wall and disposed about said rupturing means, and having a sealing surface disposed upon an end proximal to said injection wall configured to be in contact with said injection wall when said injection wall is deflected into said cavity of said capsule body.

This is advantageous in that it improves the cleanliness of the preparation of a beverage from a beverage capsule. Specifically, a beverage capsule furnished with a sealing support according to this feature is adapted to the use of a beverage machine which only applies a pressure to the area of the injection wall which corresponds to the perimeter of the sealing surface of the sealing support, effectively enclosing the space around the rupture in the injection wall through which the liquid is injected during a beverage preparation process.

The presence of a sealing support means that a seal will be created between the injection wall and anything pressed into it upon the sealing support. The sealing support locally constrains the deflection of the injection wall into the capsule, while permitting its flexure elsewhere over its surface.

The device pressed into the injection wall is configured to contain any surge of pressurized liquid which is generated by the residual pressure within the capsule after the beverage preparation process. The beverage production process is thus rendered more sanitary.

The beverage capsule is thus adapted to being employed in a beverage machine comprising an injection means which applies pressurized injection fluid to a portion of the surface of the injection wall. The injection means of the beverage machine may be so adapted to seal against the injection wall by means of the sealing support, thereby both preventing spraying of the beverage ingredient and reducing the amount of the surface of the injection wall which is exposed to the fluid. The cleanliness of the beverage capsule, and that of the beverage machine adapted to utilize it, is thereby improved.

According to a feature, the sealing support is a substantially frusto-conical annular body.

This is advantageous in that a sealing support so configured yields a large amount of surface area at its sealing surface for any given size of rupturing device disposed within the sealing support. Thus, the rupturing device may be made relatively short, while maintaining a large amount of area at the sealing surface. Positive sealing at the injection wall near the sealing support, and thus reliable performance of the beverage capsule, is thereby assured.

According to another feature, the sealing support is further provided with at least one communication port extending through the thickness of said sealing support.

This is advantageous in that the provision of at least one communication port will direct the flow of liquid from the rupture created by a rupturing means disposed at the centre of the sealing support to the region of the injection space outside the sealing support.

As the communication ports permit the fluid to cross from one side of the injection device to another, the fluid flow within the injection space of the capsule is more even. The quality and consistency of the beverages produced is thereby improved.

According to another feature, said rupturing means comprises a substantially conical piercing spike having a point projecting towards said injection wall.

This is advantageous in that a rupturing means so configured will reliably rupture the injection wall of the beverage capsule. A rupturing means configured as a spike is also easy to manufacture. Such a rupturing means is also durable, in that it is less likely than a blade to be blunted from impacts during manufacture, transport, or use.

Preferably, the rupturing means is integral with said partition.

This is advantageous in that the partition/rupturing means may be fabricated as a single piece, such as by injection moulding or the like, thereby minimizing the cost of the components of the beverage capsule.

Furnishing the partition and rupturing means in one piece will also simplify the fabrication of the beverage capsules, in that both components may be inserted into the capsule during manufacture in a single step. The beverage capsules of the present invention are thereby rendered easier and more cost-effective to produce.

In a preferred embodiment, said partition is between 1.0 mm and 5.0 mm thick, preferably between 1.5 mm and 3.0 mm thick.

This is advantageous in that when the partition is provided in such a thickness, the channels provided therein will have a length sufficient to provide a fluidic resistance against backflow and a resulting protection against spraying when the beverage capsule is removed from the beverage machine, but not so much resistance as to impede the beverage preparation process.

In another preferred embodiment, the at least one channel is a substantially cylindrical hole between 0.1 mm and 1 mm in diameter, most preferably 0.3 mm in diameter.

This is advantageous in that providing said at least one channel in a diameter as specified will yield a sufficient, but not excessive, degree of fluidic resistance within said at least one channel.

According to a feature, a plurality of channels is provided in said partition in a substantially uniform arrangement.

This is advantageous in that providing a plurality of channels in the partition in a uniform arrangement ensures an even distribution of liquid within the product space. Arranging the channels uniformly over the partition ensures that no one region of the product space, and therefore of the beverage ingredient, receives more liquid during the beverage preparation process than any other.

Thus, for beverages prepared from a soluble powder (e.g. hot cocoa) complete dissolution of the ingredient is ensured; and for beverages prepared by infusion (e.g. roasted & ground coffee), uniform infusion of the beverage ingredient is achieved. The quality and uniformity of the beverages so produced are thereby optimized.

This feature is further advantageous in that the partition may be configured in an axially symmetric arrangement. The fabrication of the partition and its insertion into the capsule body is thereby simplified, improving the economy of mass production of the beverage capsules.

According to a second aspect, the invention is directed to a beverage system comprising a beverage preparation machine suitable for functionally accommodating a beverage capsule as described above, said machine being provided with an injection means, said injection means comprising a sealing cup having a rim and a wall, and defining a chamber in communication with a mouth defined by said rim; and an injection port disposed in said wall and permitting fluid communication between said chamber and a fluid source; wherein said sealing cup is adapted to create a seal between said rim and an injection wall of a beverage capsule when said sealing cup is pressed into said injection wall.

This is advantageous in that a beverage machine so configured will engage a beverage capsule as described above in such a way as to create a seal between the sealing cup and the injection wall of the beverage cup. Upon the injection of a liquid into the sealing cup, a pressure will be applied to only the area of the injection wall within the sealing cup. This portion of the injection wall will thus be deflected into the rupturing means and rupture, creating a path for the injection of the liquid into the beverage capsule itself and realizing the advantages of the beverage capsule as described above.

Preferably, said sealing cup and said rim are substantially the same diameter as a sealing support disposed within said beverage capsule.

This is advantageous in that in such a configuration the injection wall is "pinched" between the sealing support within the beverage capsule and the sealing cup within the injection means, thereby optimizing the quality of the seal between the sealing cup and the injection wall and between the injection wall and the sealing support. The performance of the beverage preparation machine during the beverage preparation process is further improved Furthermore, by configuring the sealing cup so as to be substantially the same diameter as the sealing support, the area of the injection wall which is subjected to pressure may be minimized. This is especially advantageous when, as described above, the injection wall of the beverage capsule is ruptured by pressure generated by the application of the fluid directly to its face. The cleanliness of the operation of the beverage machine may thus be improved.

According to a third aspect, the invention is directed to a method for the preparation of a beverage, comprising the steps of providing a beverage capsule as described above; positioning a sealing cup of said beverage machine against an injection wall of said beverage capsule, said injection wall being thereby deflected into contact with a sealing support of said beverage capsule; creating a rupture in said injection wall, thereby permitting fluid communication across said injection wall; injecting a quantity of fluid through said rupture into said injection space, such that said quantity of fluid flows from said injection space through said at least one channel in said partition into said product space, thereby combining with said beverage ingredient to produce a beverage.

This is advantageous in that it realizes the advantages of the beverage capsule of the invention in the preparation of a beverage. The method of this aspect of the invention is therefore cleaner and more reliable than the methods known in the art for preparing a beverage from a beverage capsule.

According to a feature, during the step for creating a rupture, a pressure is applied to an external surface of said injection wall, thereby deflecting said injection wall into contact with a rupturing means disposed within the injection space of the beverage capsule.

This is advantageous in that it prepares a beverage from a beverage capsule without having to pierce the beverage capsule with an injection means such as a needle. Since the beverage capsule is furnished with its own means for rupturing the injection wall to permit the injection of the fluid, it is no longer necessary to puncture or otherwise rupture the beverage capsule at the beginning of beverage preparation.

Furthermore, the pressure for rupturing the injection wall may preferably be furnished by the liquid used to prepare the beverage. In such an embodiment, the injection wall will deflect and rupture automatically once the flow of liquid is started. In a beverage machine incorporating this feature, the only foreign body or substance to enter the beverage capsule is the liquid injected to prepare the beverage. In this way, the cleanliness of the beverage preparation process and the quality and consistency of the beverage so produced are optimized.

According to another feature, the application of pressure during the rupturing step creates a seal between the injection wall and a sealing support projecting from said partition and disposed about said rupturing means, said sealing support being a substantially annular body having a sealing surface disposed upon an end proximal to said injection wall.

This is advantageous in that it minimizes the area of the injection wall exposed to the pressurized liquid, as discussed above. The cleanliness of the method is thereby improved.

Other particularities and advantages of the invention will also emerge from the following description.

BRIEF DESCRIPTION OF THE DRAWINGS

In the accompanying drawings, given by way of non-limiting examples:

FIG. 5 is an orthogonal cross-section of an injection means of a beverage machine and the beverage capsule of FIG. 2, prior to an injecting step; and FIG. 6 is an orthogonal cross-section of the injection means of FIG. 6 and the beverage capsule of FIG. 2, during an injecting step.

DETAILED DESCRIPTION OF THE INVENTION

Figure 1:
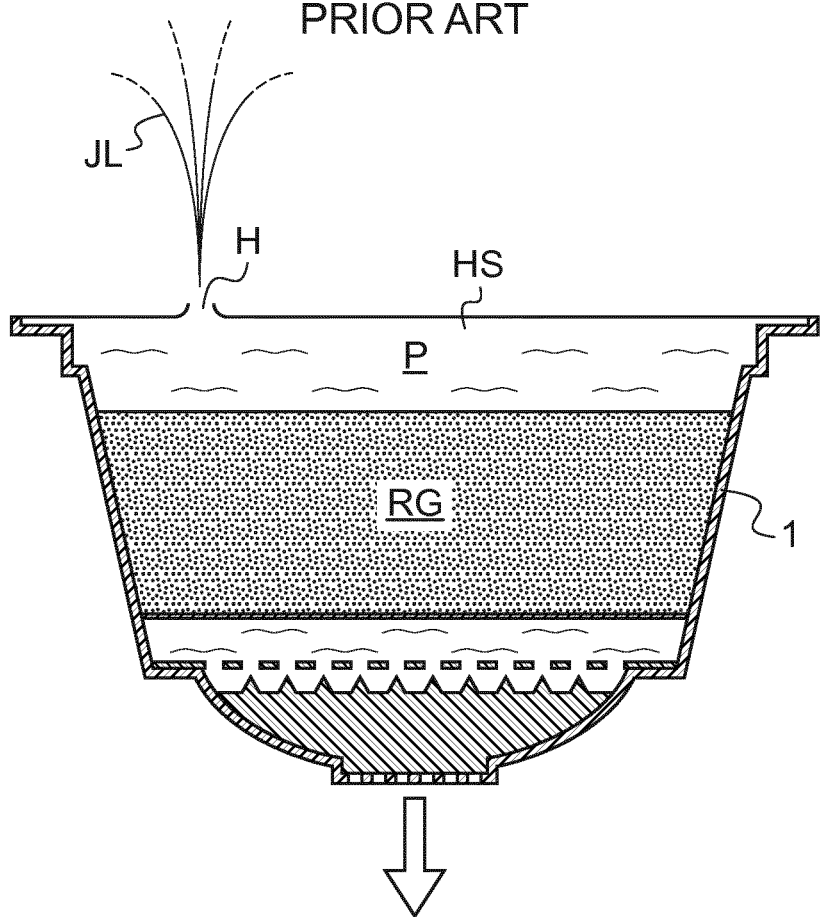
FIG. 1 is an orthogonal cross-section of a capsule according to the prior art.

FIG. 1 depicts a beverage capsule according to the prior art, and is discussed in the foregoing discussion of the prior art.

Figure 2:
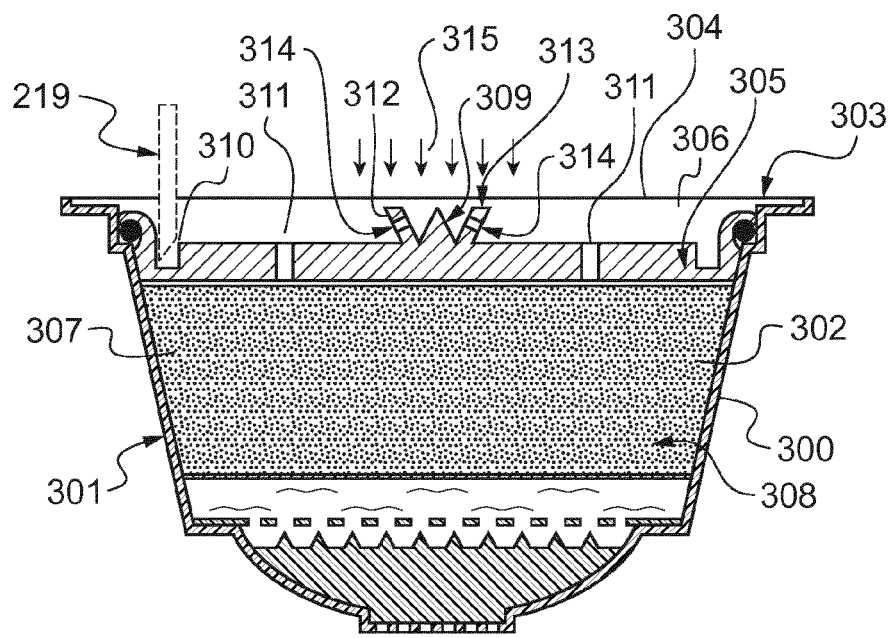
FIG. 2 is an orthogonal cross-section of a beverage capsule according to the invention.

FIG. 2 depicts a beverage capsule 300 according to the invention. The configuration of the beverage capsule 300 comprises a capsule body 301 defining a cavity 302, and an injection wall 303 disposed upon an open end 304 so as to enclose the cavity 302. The beverage capsule 300 is also provided with a partition 305 dividing the cavity 302 into an injection space 306 and a product space 307, the latter being provided with a quantity of a beverage ingredient 308.

The partition 305 is also furnished with a rupture means 309. The rupture means 309 is preferably integrated into the partition 305, reducing the number of components of the beverage capsule 300 and facilitating its fabrication. The rupture means 309 is preferably a conical spike, as depicted here, but may alternately comprise a blade, a pyramid, or other such means as may be appropriate to the particular application.

When the injection wall is deflected into the cavity 302 of the beverage capsule 303, it will come in contact with the rupturing means 308. The injection wall 302 will be thus ruptured, permitting the injection of a fluid into the injection space 306 of the beverage capsule 300 without having to employ additional, external rupturing means.

To permit its use with older beverage machines which employ a needle, such as the injection needle 219 depicted here in dashed lines, the partition 305 is further provided with a trench 310. The trench 310 offers sufficient depth for the insertion of the injection needle 219, while still permitting the partition 305 to be positioned such that the volume of the injection space 306 is minimized.

The partition is further provided with channels 311, which function substantially the same as those in the first embodiment discussed above. Depending on the particular application, the side of the partition 305 abutting the beverage ingredient 308 may be made flat for ease of fabrication. Alternately, the side of the partition 305 abutting the beverage ingredient 308 may be configured in an alternate arrangement, such as concave or patterned, thereby permitting one to achieve the optimal length of the channels 311.

The beverage capsule 300 is also provided with a sealing support 312, a substantially annular body disposed about the rupturing means 309. The end of the sealing support 312 comprises the sealing surface 313, which creates a seal between itself and the inner surface of the injection wall 303 when the latter is deflected into the chamber. The sealing support 312 serves to prevent the accidental rupturing of the injection wall 303 during handling, and may advantageously be configured to cooperate with an injection device as described below.

The sealing support 312 is further provided with communication ports 314 extending through its thickness. The communication ports 314 permit free fluid communication between the region of the injection space 306 within the sealing support and the region outside it, thereby permitting fluid communication between a rupture in the injection wall 303 in the region of the rupturing means 309 and the channels 311 disposed in the partition 305.

In a preferred embodiment, the channels 311 in the partition 305 are disposed in a uniform arrangement and configured so as to offer a fluidic resistance. More specifically, the channels 311 are configured to resist the flow of fluid through them, so that any residual pressure built up during the beverage preparation process is retained within the product space 307 and preventing any squirting of liquid from the beverage capsule.

Preferably, the channels 311 are between 0.5 mm and 3 mm long and 0.1 and 1.0 mm in diameter, and most preferably 1.0 mm thick and 0.3 mm in diameter. Channels having these dimensions yield the optimal fluidic resistance under the conditions generally found in beverage capsules during and after the beverage preparation process.

Figure 3:
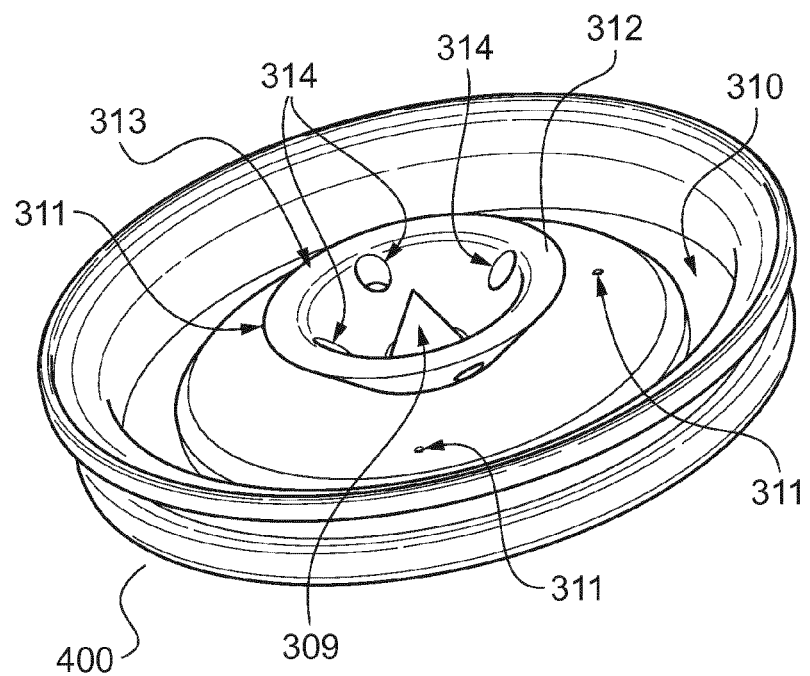
FIG. 3 is an illustration of the partition of the beverage capsule of FIG. 2.

FIG. 3 is an enlarged illustration of a possible embodiment of a partition 400 of the second embodiment. The partition 400 is provided with a centrally-located rupturing means 309, which is surrounded by a sealing support 312. The sealing support 312 is provided with a sealing surface 313 and four communication ports 314. The partition 400 is further provided with three channels 311 disposed in radial symmetry upon the face of the partition 400, and a trench 310 disposed proximate to the circumference of the partition 400.

Figure 4:
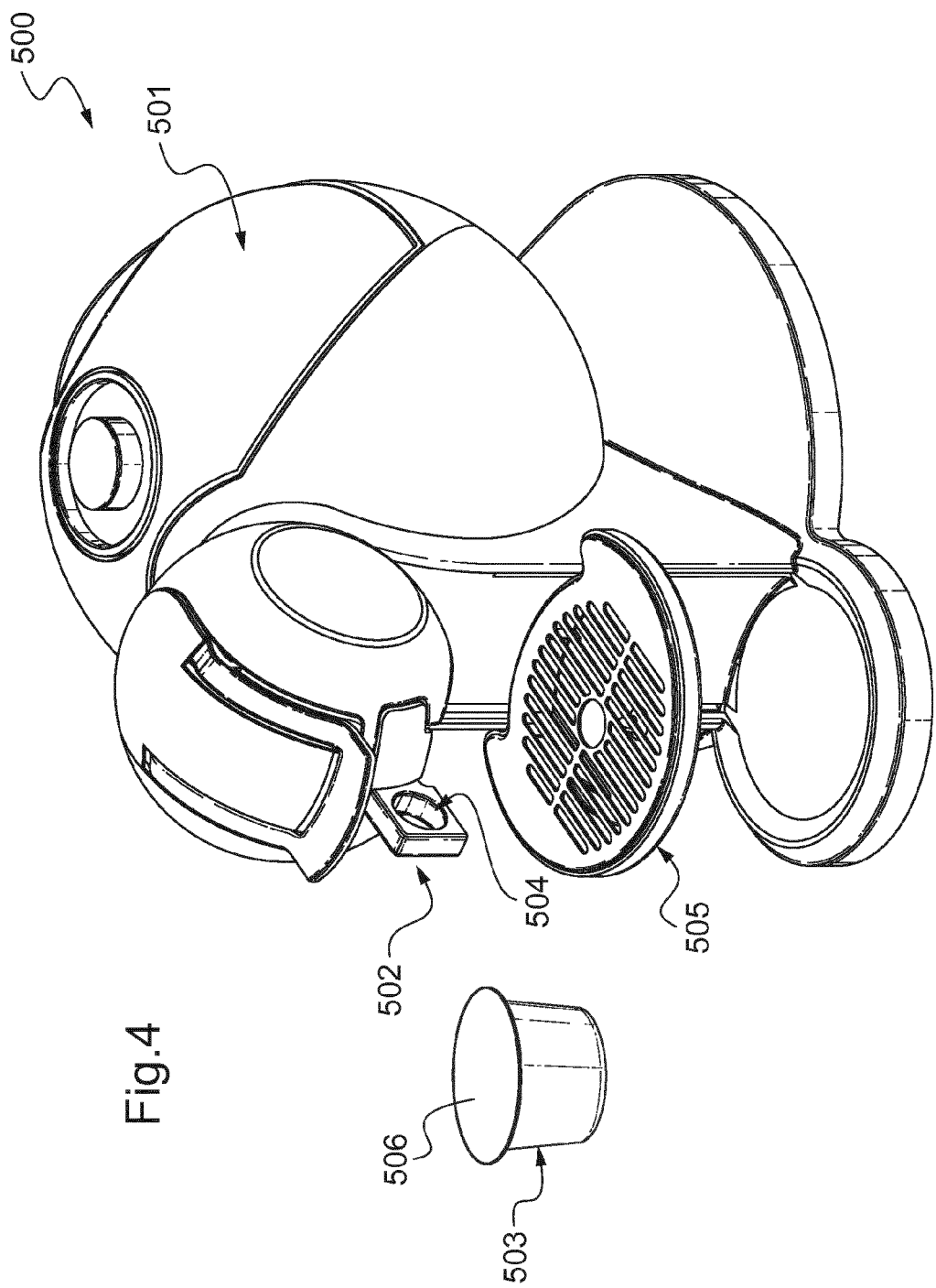
FIG. 4 is an illustration of a beverage machine according to an aspect of the invention.

FIG. 4 depicts a beverage machine 500 according to an aspect of the invention. The beverage machine 500 comprises a fluid supply 501, which may be a water tank as in this embodiment, or alternately plumbed into a potable water supply. The beverage machine 500 further comprises a capsule receptacle 502 for receiving a beverage capsule 503, here configured as a sliding drawer with a finger-loop 504.

During operation, the user will place a container such as a mug on the platen 505, and insert a beverage capsule 503 into the capsule receptacle 502. Upon starting the beverage preparation process, the beverage machine 500 will rupture the injection wall 506 of the beverage capsule 503. Fluid will be conducted from the fluid reservoir 501, heated such as by an electrical resistance heater, injected into the beverage capsule 503 to mix with a beverage ingredient therein to create a beverage, which is subsequently dispensed into the container.

FIG. 5 depicts an injection means 600 of a beverage machine and the capsule of FIG. 3, prior to an injecting step. The injection means comprises a head frame 601 and a capsule receptacle 602. The capsule receptacle 602 is preferably mobile, permitting the beverage capsule 300 to be inserted and withdrawn from the injection means 600. The capsule receptacle 602 further comprises a shoulder 602A configured to engage the beverage capsule 300 and hold it in place.

The head frame 601 is immobile relative to the capsule receptacle 602 and the beverage capsule 300, generally integrated with a beverage machine such as the one depicted in FIG. 5. The head frame 601 comprises a sealing cup 603. The sealing cup 603 comprises a rim 604 and a wall 605, which define the cup chamber 606 in communication with the cup mouth 607. The sealing cup 603 is further provided with an injection port 608 which is in communication with said cup chamber 606 and a fluid supply 609. The sealing cup 603 is thereby configured to deliver a quantity of fluid from the fluid source 609 to the cup chamber 606, as well as anything communicating with the cup chamber 606.

FIG. 6 depicts the injection means 600 during an injection step. The sealing cup 603 is pressed into the injection wall 303 of the beverage capsule 300 with force 700. This will create a seal between the injection wall 303 and the sealing surface 313 of the sealing support 312, as well as between the rim 604 of the sealing cup 603 and the injection wall 303. Preferably, the rim 604 of the sealing cup 603 is substantially the same diameter as the sealing support 312 of the beverage capsule 300, thereby creating the strongest possible seal.

At the same time, a fluid 701 is injected through the injection port 608 with a pressure 702. As the chamber 606 is in fluid communication with the injection port 608, the pressure 702 is applied to the injection wall 303 over the region corresponding to the sealing cup 603. This causes the injection wall 303 to deflect into the rupture means 309, thereby rupturing the injection wall 303 at the rupture 703.

The fluid 701 flows through the rupture 703, through the communication ports 314 disposed in the sealing support 312 and through the channels 331 into the product space 307. The fluid 701 infuses in the product space, thereby creating the beverage 704 which flows from the beverage capsule 300 through the outlet 705.

Of course, the invention is not limited to the embodiments described above and in the accompanying drawings. Modifications remain possible, particularly as to the construction of the various elements or by substitution of technical equivalents, without thereby departing from the scope of protection of the invention.

The exact configuration of the elements of the invention may be adapted to the application in which they are to be employed. In particular, the size, shape, number, and arrangement of the channels may be altered according to the particular beverage ingredient and capsule form employed in a particular embodiment. The temperatures, pressures, and other such variables of the beverage preparation process may also be modified without departing from the scope of the invention.

Finally, it should also be understood that a beverage capsule need not necessarily be provided with a partition having at least one channel providing a fluidic resistance and a rupturing means disposed upon said partition. For example, one may furnish a partition having a rupturing means and openings and/or cut-outs which permit the free passage of fluid through the capsule. While the at least one channel providing a fluidic resistance and the rupturing means may indeed function optimally in concert, it should be understood that it is not obligatory to furnish both within a capsule according to the invention.

The invention claimed is:

1. A beverage capsule comprising:
   a cup-shaped capsule body having an open end and defining a cavity in communication with the open end;
   an injection wall disposed upon the open end to enclose the cavity;
   a partition disposed within the cup-shaped capsule body and dividing the cavity into an injection space adjacent to the injection wall and a product space opposite the injection wall, the partition provided with at least one channel extending through a thickness of the partition and configured to retard fluid flow between the injection space and the product space;
   a rupturing member disposed within the injection space, the rupturing member configured to rupture the injection wall when the injection wall is deflected into the cavity of the cup-shaped capsule body;
   a quantity of a beverage ingredient disposed within the product space; and
   a sealing support projecting from the partition towards the injection wall and circumscribing the rupturing member, the sealing support having a sealing surface disposed upon an end proximal to the injection wall, the sealing surface is configured to be distanced from the injection wall before deflection of the injection wall and configured to be in contact with the injection wall when the injection wall is deflected into the cavity of the cup-shaped capsule body.

2. The beverage capsule of claim 1, where the sealing support is a frusto-conical annular body.

3. The beverage capsule of claim 1, where the sealing support is provided with at least one communication port extending through a thickness of the sealing support.

4. The beverage capsule of claim 1, where the rupturing member comprises a conical piercing spike having a point projecting towards the injection wall.

5. The beverage capsule of claim 1, where the rupturing member is integral with the partition.

6. The beverage capsule of claim 1, wherein the partition is between 1.0 mm and 5.0 mm thick.

7. The beverage capsule of claim 1, wherein the at least one channel is a cylindrical hole between 0.1 mm and 1.0 mm in diameter.

8. The beverage capsule of claim 1, wherein a plurality of channels are provided in the partition in a uniform arrangement.

9. The beverage capsule of claim 1, wherein the rupturing member is a single rupturing member disposed at the center of the sealing support.

10. The beverage capsule of claim 1, wherein the sealing support is configured to not be in contact with the injection wall when the injection wall is not deflected.

11. A beverage apparatus comprising the beverage capsule according to claim 1 and a beverage preparation machine suitable for functionally accommodating the beverage capsule,
   the machine being provided with an injection member, the injection member comprising:

a sealing cup having a rim and a wall, and defining a chamber in communication with a mouth defined by the rim;

an injection port disposed in the wall and permitting fluid communication between the chamber and a fluid source; and the sealing cup is adapted to create a seal between the rim and the injection wall of the beverage capsule when the sealing cup is pressed into the injection wall, the sealing cup and the rim are substantially the same diameter as the sealing support disposed within the beverage capsule.

\* \* \* \* \*